United States Patent Office 3,059,881
Patented Oct. 23, 1962

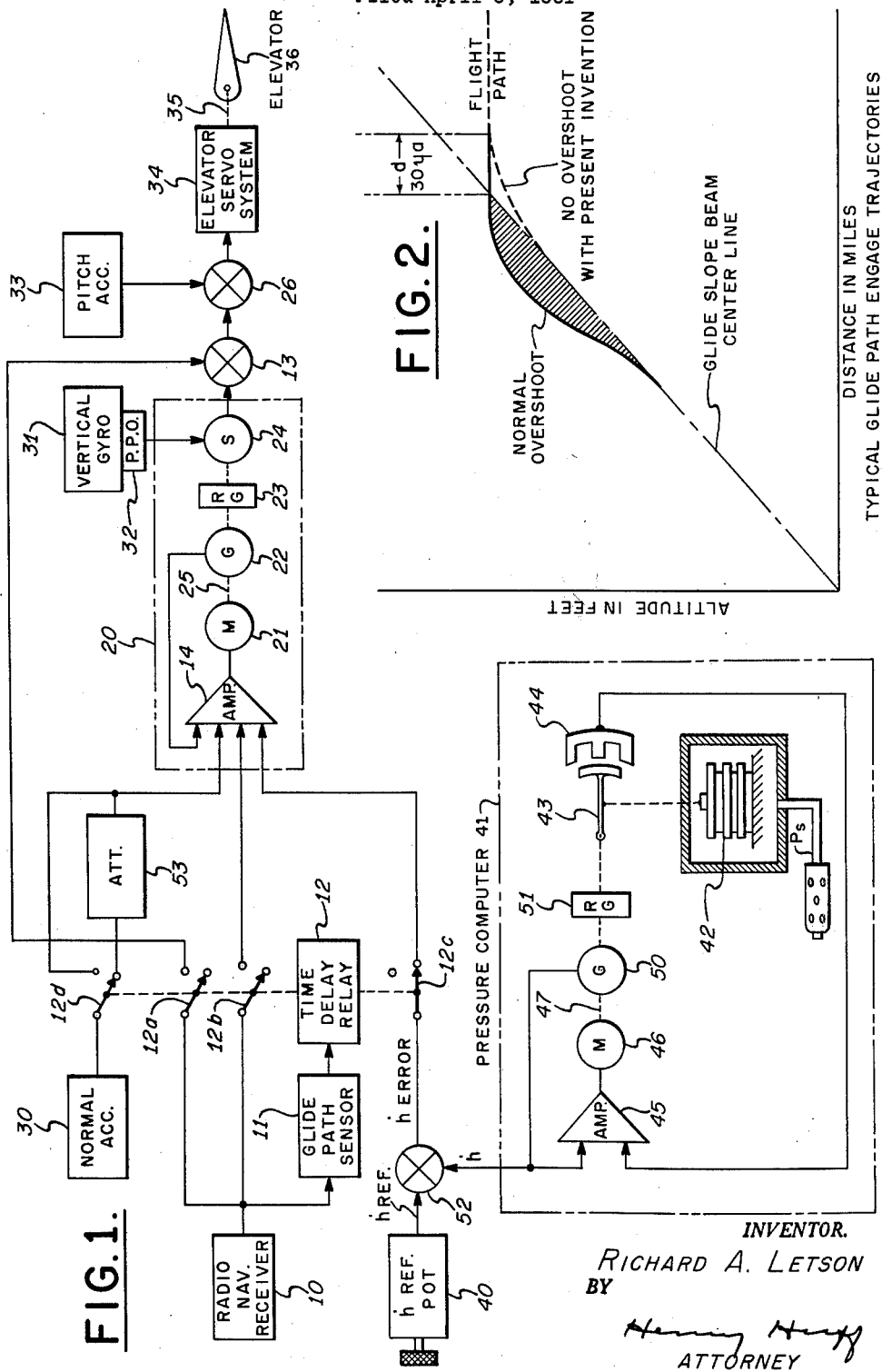

3,059,881
AUTOMATIC APPROACH SYSTEM FOR AIRCRAFT
Richard A. Letson, Phoenix, Ariz., assignor to Sperry Rand Corporation, Great Neck, N.Y., a corporation of Delaware
Filed Apr. 6, 1961, Ser. No. 101,275
5 Claims. (Cl. 244—77)

This invention relates to automatic approach apparatus for aircraft and particularly to apparatus for capturing the center line of a radio defined glide slope beam of an instrument landing system.

In certain prior art automatic pilot systems, for example those of the type disclosed in U.S. application Serial No. 571,813 entitled "Aircraft Automatic Pilots," of H. Miller et al. filed March 15, 1956, now Patent No. 3,007,656, issued November 7, 1961, when the automatic approach mode is selected, the glide path control configuration is engaged automatically when the center line of the glide path beam is penetrated. The center line of the glide path beam of a conventional instrument landing system (I.L.S.) is disposed at an angle of 2½° with respect to the earth. Therefore, if the aircraft maintained a horizontal flight path prior to penetrating the beam center line, it would have to change its flight path by 2½° in a downward direction to follow the center line of the glide path beam. This necessitates a 2½° pitch down bias to prevent a stand-off error from the center line of the glide slope beam. In the automatic approach system described in the aforementioned application Serial No. 571,813, the 2½° pitch down bias is provided by a signal representative of the integral of the displacement of the aircraft from the center line of the glide slope. This arrangement required a stand-off error above the beam for a time interval long enough for the integrating device responsive to the glide slope displacement signal to generate the necessary 2½° pitch down signal. Since the gain of the glide path integral signal must be relatively low for reasons of flight path stability, the aforementioned arrangement results in the aircraft standing-off above the beam center for a long period of time, i.e., an undesirable overshoot.

Another prior art solution to this problem is to provide for manual insertion of the necessary 2½° pitch down bias by the human pilot at the time he manually engages the glide path control mode of operation. This is undesirable since it requires careful manipulation by the human pilot at a time when he is occupied with a number of other important matters.

The problem is further aggravated by the fact that it is not always convenient to maintain a horizontal flight path at the time the aircraft approaches the glide slope beam. Under actual flight conditions the center of the glide slope beam may be penetrated from any flight path angle. Thus, merely adding a bias signal representative of 2½° of nose-down pitch whenever the glide path is engaged does not solve the problem under all conditions. The present invention automatically provides the correct pitch bias for any aircraft beam penetration angle from any angle including intercepting the beam in a dive angle greater than 2½° or in a climb.

It is therefore a primary object of the present invention to provide an automatic approach system for aircraft which captures the center line of the glide slope beam without overshoot.

It is a further object of the present invention to provide an automatic approach system which automatically captures the center line of a glide slope beam irrespective of the aircraft flight path penetration angle.

The above objects are accomplished by controlling the pitch attitude of the aircraft in accordance with a rate of descent error signal which is rendered effective upon the aircraft reaching a predetermined position with respect to the center line of the glide slope beam before the aircraft intercepts the center line thereof. The error signal is maintained effective for a predetermined time interval thereafter determined by the distance from the engage point to the beam center line, the intercept angle of the aircraft with respect to the beam center line, the integration rate of the system and the nominal approach velocity of the aircraft. The rate of descent signal is obtained by comparing a signal representative of a nominal rate of descent with a signal representative of the actual rate of descent of the aircraft. The difference therebetween is a rate of descent error signal which is connected for a predetermined time interval to control the elevator of the aircraft to command a pitch attitude change which will cause the aircraft to capture the center line of the glide slope beam without overshoot. The present invention is a modification of the invention described in U.S. patent application Serial No. 101,276, filed on April 6, 1961 in the name of S. Osder.

Referring now to the drawings,

FIG. 1 is a schematic wiring diagram incorporating the present invention in an automatic approach system; and FIG. 2 is a graph showing typical glide path engage trajectories of an aircraft with and without the present invention.

The present invention will now be described applied to an automatic flight control system as described in the aforementioned patent application Serial No. 571,813 which utilizes a velocity servo system. It will be appreciated that the present invention is equally applicable to flight control systems utilizing displacement servo systems of the type disclosed in U.S. Patent No. 2,636,699 entitled, Automatic Pilot for Aircraft, issued to G. Jude et al. on April 28, 1953 and the invention is also applicable to flight director systems, for example, of the type disclosed in U.S. Patent No. 2,613,352 entitled, Radio Navigation System issued to S. Kellogg II on October 7, 1952.

Referring now to FIG. 1, a radio navigation receiver 10 is tuned to a particular I.L.S. frequency in order to provide a D.C. signal having a magnitude and polarity representative of the magnitude and sense respectively of the displacement of the aircraft with respect to the center line of a particular glide slope beam. Normally in the approach mode of operation in the absence of the present invention when the aircraft intercepts the center line of the radio beam, the displacement signal from the receiver 10 is connected through contact arms 12a and 12b to an input terminal of an algebraic summation device 13 and to an input terminal of a summing amplifier 14 respectively. The summing amplifier 14 is a part of an electromechanical integrating device 20. The integrator 20 also includes a servomotor 21 connected to be controlled by the signal from the amplifier 14, a tachometer generator 22, a reduction gearing 23, and a synchro transmitter 24. The output shaft 25 of the servomotom 21 is connected to drive the tachometer generator 22 and the rotor of the synchro transmitter 24, the latter through the reduction gearing 23. The tachometer generator 22 provides a rate feedback signal to an input terminal of the summing amplifier 14 which establishes the basic gain of the electromechanical integrator 20.

A normal accelerometer 30 is mounted in the aircraft to be responsive to vertical accelerations and normally provides a signal representative thereof for vertical flight path damping purposes through contact arm 12d when in its rightward position to an input terminal of the summing amplifier 14. A vertical gyro 31 is mounted in the aircraft in order that its pitch pick-off 32 provides a signal representative of the deviation of the aircraft from a predetermined pitch attitude which is connected to excite the stator of the synchro transmitter 24 in accordance therewith. The output terminal of the synchro 24 is connected to an input terminal of the algebraic summation device 13 in order that the signal from the synchro 24 is in opposition to the signal appearing on the other input terminal of the device 13. The output terminal of the summation device 13 is connected to an input terminal of another algebraic summation device 26, the latter has its other input terminal connected to be responsive to a signal representative of the angular acceleration around the pitch axis from paired pitch accelerometers 33. The structure and mounting of the paired pitch accelerometers 33 are more fully disclosed in the aforementioned application Serial No. 571,813. The output terminal of the algebraic summation device 26 is connected to an elevator servo system 34 which has its output shaft 35 connected to position the elevator 36 of the aircraft. Preferably, the servo system in the embodiment shown is a velocity type servo system as described in the aforementioned U.S. application Serial No. 571,813.

Utilizing the system described immediately above, the displacement signal representative of the position of the aircraft with respect to the center of the glide slope beam from the radio receiver 10 is applied directly through the contact arm 12a to the elevator servo system 34 by means of the device 13 while the integral of the displacement signal is applied to the elevator servo system 34 through the contact arm 12b and the integrator 20. The combination of displacement and integral of displacement glide slope signals for approaching and maintaining the glide slope beam results in the aircraft standing-off above beam center line for an undesirably long period of time as explained previously. This is shown graphically in FIG. 2 wherein the dash-dot line indicates the glide slope beam center line and the solid line indicates the flight path of an aircraft utilizing the above system. With the aircraft approaching the glide slope beam at a horizontal flight path, the shaded area above the beam center line represents the overshoot of the aircraft, i.e., the time required for the integral signal to become effective to return the aircraft to the glide slope beam center line. This undesirable overshoot is eliminated by means of the present invention in a manner to be explained forthwith.

Referring again to FIG. 1, a reference signal $\dot{h}_{ref}$ is generated in a potentiometer 40 representative of a nominal rate of descent that is a function of the angle of the center line of the glide slope beam with respect to the earth and the approach speed of the aircraft as well as the distance $d$ as shown in FIG. 2 from the engage point to the beam center. This signal, $\dot{h}_{ref}$, commands a change in the pitch attitude of the craft to the nominal angle or slope of the glide slope beam. In order to anticipate a lag in the response of the aircraft to this signal, a glide path sensor 11 which functions as a down bias actuator is biased to actuate a time delay relay 12 when the aircraft is a predetermined nominal distance $d$ from the glide slope beam center line as shown in FIG. 2. The nominal distance $d$ is based upon the response characteristics of the flight control system and aircraft combination. Since the approach speed for a particular aircraft will vary very little from one approach to another a nominal approach speed V can be used with little error. The nominal rate of descent reference signal so generated is a voltage defined by $\dot{h}_{ref} = V \sin 2\frac{1}{2}°$ where the glide slope center line is at a $2\frac{1}{2}°$ angle with respect to the earth. The reference signal $\dot{h}_{ref}$ is thus representative of a desired rate of descent which may also be considered as a commanded flight path angle.

A signal representative of the actual rate of descent $\dot{h}$ of the aircraft is obtained from a pressure computer 41 or alternatively from a radio altimeter (not shown) or a combination thereof. The pressure computer 41 may be of the type disclosed in U.S. Patent 2,729,780 entitled, Altitude Control for Automatic Pilots of H. Miller et al. issued January 3, 1956. The pressure computer 41 includes an evacuated bellows 42 responsive to static pressure which positions the armature of an E-pick-off 44 against the spring restraint of a torsion bar 43. The output signal from the E-pick-off 44 has an amplitude and phase representative of the magnitude and sense respectively of the armature displacement from a force balance central position.

The pick-off 44 is connected to an input terminal of a summing amplifier 45 which in turn is connected to control a servomotor 46. The output shaft 47 of the servomotor 46 is connected to drive a tachometer generator 50 and also, through a reduction gearing 51, the torsion bar 43 is rotated in a direction to provide a restoring moment which opposes the moment resulting from the evacuated diaphragm's response to a pressure change. The restoring moment obtained by winding the torsion bar 43 returns the E-pick-off armature to its null position following any barometric pressure change which causes the diaphragm 42 to displace the armature. The tachometer generator 50 provides a signal representative of the actual rate of change of aircraft altitude, $\dot{h}$, i.e. rate of descent, which is connected to an input terminal of the summing amplifier 45 in feedback fashion to stabilize the force balance servo loop. The $\dot{h}$ signal is also connected to an input terminal of an algebraic summation device 52. The other input terminal of the summation device 52 is connected to the $\dot{h}_{ref}$ potentiometer 40. The nominal rate of descent signal $\dot{h}_{ref}$ from the potentiometer 40 is applied in opposition to the actual rate of descent signal $\dot{h}$ from the tachometer generator signal 50 in order that the output signal from the summation device 52 is an error signal representative of the difference therebetween, i.e., $\dot{h}_{error}$.

Utilizing the present invention during the approach mode of operation, the $\dot{h}_{error}$ signal is rendered effective when the aircraft reaches a predetermined distance $d$ from the center line of the glide slope beam and remains effective for a short predetermined time interval thereafter by means of the glide path sensor 11 and the time delay relay 12 in a manner to be explained. After this short predetermined time interval, the $\dot{h}_{error}$ signal is rendered ineffective and remains so during the remainder of the approach.

The glide path sensor 11 is connected to be responsive to the displacement signal from the radio receiver 10 and in turn is connected to actuate the time delay relay 12. The glide path sensor 11 is biased to operate when the aircraft is at a predetermined distance $d$ from the center line of the radio beam which may for example be equivalent to a 30 microamp displacement signal as shown in FIG. 2. When the aircraft is at the distance $d$ from the center line of the radio beam, the glide path sensor 11 operates to actuate the time delay relay 12 causing the contact arms 12a, 12b and 12c thereof to be positioned to their lowermost position while the contact arm 12d thereof is positioned to its leftward position all as shown in solid lines. By this action the contact arms 12a and 12b render the displacement signal ineffective by disconnecting the receiver 10 from the summation device 13 and the summing amplifier 14 respectively.

Simultaneously the $\dot{h}_{error}$ signal is rendered effective by connecting the summation device 52 to the summing amplifier 14 and the gain of the vertical flight path damping signal from the normal accelerometer 30 is attenuated by passing it through the contact arm 12d and the attenuator 53. The attenuator 53 is connected to an input terminal of the summing amplifier 14. The gain of the vertical flight path damping signal from the normal accelerometer 30 is attenuated to render it compatible with the $\dot{h}_{error}$ signal in order to provide optimum gain through the system during the predetermined time interval defined by the time delay relay 12. It may also be desirable in certain types of integrators such as 20 to vary the gain of the tachometer feedback signal from the tachometer generator 22 for optimum system performance. By connecting the summation device 52 to the summing amplifier 14, the deviations of the aircraft from the flight path angle or vertical speed commanded by the $\dot{h}_\text{ref}$ signal, which is represented by the $\dot{h}_\text{error}$ signal, are applied to the integrator 20. The integrated $\dot{h}_\text{error}$ signal from the integrator 20 is applied to the elevator servo system 34 to control the position of the elevator 36 to command a corrective pitch rate.

The effect of the $\dot{h}_\text{error}$ signal on the glide path engage trajectory when rendered effective prior to reaching the center line of the glide slope beam can be appreciated by referring to the graph of FIG. 2. For the predetermined time interval defined by the time delay relay which may for example be 10 seconds, the integral of the $\dot{h}_\text{error}$ signal provides the required pitch-down bias to cause the aircraft to approach the center of the beam. By the end of the predetermined time interval, the aircraft is descending quite close to and at the same nominal slope as the center of the radio beam in order that the aircraft asymptotically approaches the center line without overshoot when the radio displacement and integral of radio displacement signal again become effective. After the predetermined time interval, the contact arms 12a, 12b and 12c are raised to their upper positions and the contact arm 12d to its rightward position thereby rendering the radio displacement and the integral of radio displacement signals again effective while rendering the $\dot{h}_\text{error}$ signals ineffective. The signal from the normal accelerometer 30 is also returned to its normal gain condition. This results in the aircraft being controlled by the radio displacement and integral thereof signals in addition to the vertical path damping and stabilization signals described above during the remainder of the approach thereby providing a system for asymptotically approaching and maintaining the center line of the radio beam without overshoot.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In apparatus by means of which an aircraft may be controlled to capture the center of a radio defined glide slope beam, means for generating a first signal representative of a rate of descent that is a function of the distance from the engage point to the beam center, the angle of said glide slope beam with respect to the earth and the speed of said aircraft, means for generating a second signal representative of the actual rate of descent of said aircraft, algebraic summation means responsive to said first and second signals for providing a third signal representative of the difference therebetween, means responsive to the displacement of said aircraft from the center of said radio beam for providing a fourth signal representative thereof, signal utilization means normally responsive to said fourth signal and unresponsive to said third signal for controlling said aircraft to approach and maintain the center of said radio beam, and means responsive to said displacement signal for rendering said signal utilization means responsive to said third signal and unresponsive to said fourth signal when said aircraft is a predetermined distance from the center of said radio beam.

2. Apparatus of the character described in claim 1 in which said last-mentioned means further includes time delay means for maintaining said third signal effective and rendering said fourth signal ineffective for a predetermined time interval.

3. In automatic approach apparatus by means of which an aircraft may be controlled to capture the center of a radio defined glide slope beam, means for generating a first signal representative of a nominal rate of descent that is a function of the distance from the engage point to the beam center, the angle of said glide slope beam with respect to the earth and the approach speed of the aircraft, altimeter means for generating a second signal representative of the actual rate of descent of said aircraft, algebraic summation means responsive to said first and second signals for providing a third signal representative of the difference therebetween, radio receiving means responsive to the displacement of said aircraft from the center of said radio beam for providing a fourth signal representative thereof, integrating means normally responsive to said fourth signal and normally unresponsive to said third signal, pitch servo means connected to said integrating means and further normally responsive to said fourth signal for controlling said aircraft to approach and maintain the center of said radio beam, and means including time delay means responsive to said fourth signal for rendering said third signal effective for a predetermined time interval when said aircraft is at a predetermined distance from the center of said glide slope and for rendering said fourth signal ineffective during said time interval.

4. Apparatus of the character described in claim 3 including means for providing a fifth signal representative of the normal acceleration experienced by said craft for vertical flight damping purposes, said flight path damping signal normally having a predetermined gain and means for attenuating the gain of said flight path damping signal during said predetermined time interval.

5. Automatic flight control apparatus by means of which an aircraft may be controlled to capture the center of a radio defined glide slope beam wherein said apparatus includes radio receiving means for providing a signal representative of the displacement of said aircraft from the center of said radio beam, integrating means normally responsive to said displacement signal, first algebraic summation means connected to be responsive to said integrating means and normally connected to be responsive to said displacement signal, normal accelerometer means connected to said integrating means for providing a vertical flight path damping signal normally having a predetermined gain, means including elevator servo means connected to said first algebraic summation means for controlling the elevator in accordance with the signal therefrom, means for generating a signal representative of a nominal rate of descent that is a function of the distance from the engage point to the beam center, the angle of said glide slope beam with respect to the earth and the approach speed of said aircraft, means for generating a signal representative of the actual rate of descent of said aircraft, second algebraic summation means responsive to said nominal and actual rates of descent signals for providing a signal representative of the difference therebetween, said difference signal being normally ineffective, means including time delay means for rendering said displacement signal ineffective, for connecting said second algebraic summation means to said integrating means thereby rendering said difference signal effective, and for attenuating said vertical flight path damping signal, all for a predetermined time interval, and means responsive to said displacement signal for actuating said means including time delay means when the aircraft is a predetermined distance from the center of said radio beam.

References Cited in the file of this patent

UNITED STATES PATENTS

| | | |
|---|---|---|
| 2,830,291 | Hecht | Apr. 8, 1958 |
| 2,996,271 | Lindahl | Aug. 15, 1961 |